United States Patent
Canady et al.

(10) Patent No.: US 11,824,740 B2
(45) Date of Patent: *Nov. 21, 2023

(54) METHOD AND SYSTEM FOR INDUCING SECURE COMMUNICATIONS BETWEEN ONE OR MORE EMULATED SERVERS AND EMULATED CLIENTS TO TEST A DEVICE THEREBETWEEN

(71) Applicant: Spirent Communications, Inc., San Jose, CA (US)

(72) Inventors: Kevin Canady, Plano, TX (US); Richard Wank, Plano, TX (US); Xiaohua Wu, Beijing (CN); Chunsheng Li, Beijing (CN)

(73) Assignee: Spirent Communications, Inc., San Jose, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/379,907

(22) Filed: Jul. 19, 2021

(65) Prior Publication Data

US 2022/0006711 A1 Jan. 6, 2022

Related U.S. Application Data

(63) Continuation of application No. 15/838,047, filed on Dec. 11, 2017, now Pat. No. 11,070,451.

(51) Int. Cl.
*H04L 43/04* (2022.01)
*H04L 9/40* (2022.01)
(Continued)

(52) U.S. Cl.
CPC .............. *H04L 43/04* (2013.01); *H04L 43/06* (2013.01); *H04L 43/0888* (2013.01);
(Continued)

(58) Field of Classification Search
None
See application file for complete search history.

(56) References Cited

U.S. PATENT DOCUMENTS

| 5,995,753 A | 11/1999 | Walker |
| 6,252,891 B1 | 6/2001 | Perches |

(Continued)

FOREIGN PATENT DOCUMENTS

WO 2017053961 A1 3/2017

OTHER PUBLICATIONS

Flueler, Linus. Finite State Machine and Multithreading using NET. Mar. 2, 2006. 7 pages. http://www.codeproject.com/Articles/5540/Finite-State-Machine-and-Multithreading-using-NET.

(Continued)

*Primary Examiner* — Quang N Nguyen
(74) *Attorney, Agent, or Firm* — HAYNES BEFFEL & WOLFELD, LLP; Ernest J. Beffel, Jr.

(57) ABSTRACT

The technology disclosed provides a method of testing handling of HTTPS sessions of a plurality of clients with a plurality of servers by a switching, bridging or routing device (i.e., a DUT), where the testing is conducted by a test system coupled to ports on the DUT. The method includes using client state machines running on at least four processor cores, communicating through the DUT with server state machines running on at least four additional processor cores. The method also includes, for each connection between a client represented by a client state machine and a server represented by a server state machine, setting up an HTTPS session by negotiating an encryption protocol and completing an HTTPS handshake. Further, the method includes following the setup of between 100,000 HTTPS sessions and 10,000,000 HTTPS sessions, conducting a stress test (Continued)

including combining payload data and header information without using the negotiated encryption.

20 Claims, 8 Drawing Sheets

(51) Int. Cl.
 *H04L 43/06* (2022.01)
 *H04L 43/50* (2022.01)
 *H04L 43/0888* (2022.01)
 *H04L 67/02* (2022.01)
 *H04L 67/01* (2022.01)

(52) U.S. Cl.
 CPC ............ *H04L 43/50* (2013.01); *H04L 63/166* (2013.01); *H04L 63/061* (2013.01); *H04L 67/01* (2022.05); *H04L 67/02* (2013.01)

(56) References Cited

U.S. PATENT DOCUMENTS

| | | | |
|---|---|---|---|
| 6,463,565 B1 | 10/2002 | Kelly et al. | |
| 6,654,701 B2 | 11/2003 | Hatley | |
| 6,728,929 B1 | 4/2004 | Luong | |
| 7,016,340 B1 | 3/2006 | McKinion | |
| 7,158,907 B1 | 1/2007 | Soldo | |
| 7,162,377 B2 | 1/2007 | Amrod et al. | |
| 7,181,360 B1 | 2/2007 | Nikolac et al. | |
| 7,272,114 B1 | 9/2007 | Barkan | |
| 7,647,219 B2 | 1/2010 | Overturf et al. | |
| 7,826,381 B1 * | 11/2010 | Kastuar | H04L 12/4641 370/242 |
| 8,649,275 B2 | 2/2014 | Pyatkovskiy et al. | |
| 8,996,920 B2 | 3/2015 | Fattah | |
| 10,263,788 B2 * | 4/2019 | Kinder | H04L 63/101 |
| 11,070,451 B2 * | 7/2021 | Canady | H04L 63/166 |
| 11,233,801 B1 * | 1/2022 | Robinson | H04L 67/561 |
| 11,343,002 B2 * | 5/2022 | Leather | H01Q 3/267 |
| 11,374,973 B2 * | 6/2022 | Yang | H04L 63/16 |
| 2002/0144015 A1 | 10/2002 | Lortz | |
| 2003/0016819 A1 * | 1/2003 | Cheng | H04L 63/04 380/2 |
| 2004/0190519 A1 | 9/2004 | Dugatkin | |
| 2004/0240440 A1 | 12/2004 | Wild et al. | |
| 2006/0039538 A1 | 2/2006 | Minnis et al. | |
| 2006/0045021 A1 | 3/2006 | Deragon et al. | |
| 2008/0031151 A1 | 2/2008 | Williams | |
| 2008/0198742 A1 | 8/2008 | Kaempfer | |
| 2009/0089863 A1 | 4/2009 | Vanniarajan | |
| 2010/0061378 A1 | 3/2010 | Joyner et al. | |
| 2010/0269044 A1 * | 10/2010 | Ivanyi | H04L 67/306 709/224 |
| 2011/0214157 A1 | 9/2011 | Korsunsky et al. | |
| 2013/0010602 A1 * | 1/2013 | Ramanath | H04L 67/08 370/241 |
| 2013/0138827 A1 | 5/2013 | Loach | |
| 2013/0346719 A1 | 12/2013 | Tomlinson et al. | |
| 2017/0163693 A1 * | 6/2017 | Skuratovich | H04L 69/161 |
| 2017/0208560 A1 | 7/2017 | Papa et al. | |
| 2017/0263332 A1 * | 9/2017 | Kapoor | G11C 29/12015 |
| 2018/0176020 A1 | 6/2018 | Mukhopadhyay | |

OTHER PUBLICATIONS

Lte. 3GPP TS 36.523-1 V8.1.0. 3GPP Technical Specification. Mar. 2009. 667 pages.
Spirent Communications: Inspired Innovation, Reference Manual: Spirent TestCenter System, Aug. 2006, pp. 1-133.
Rescoral, E., The Transport Layer Security (TLS) Protocol Version 1.3. Internet Engineering Task Force (IETF) Request for Comments #8446, Aug. 2018.
Dierks, T. et al., The Transport Layer Security (TLS) Protocol Version 1.2, Network Working Group Request for Comments: 5246, Aug. 2008.

* cited by examiner

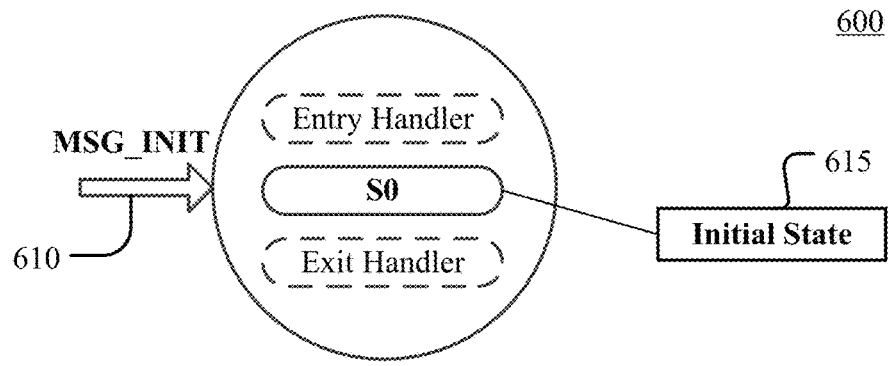
Fig. 6 – State-Message Duple
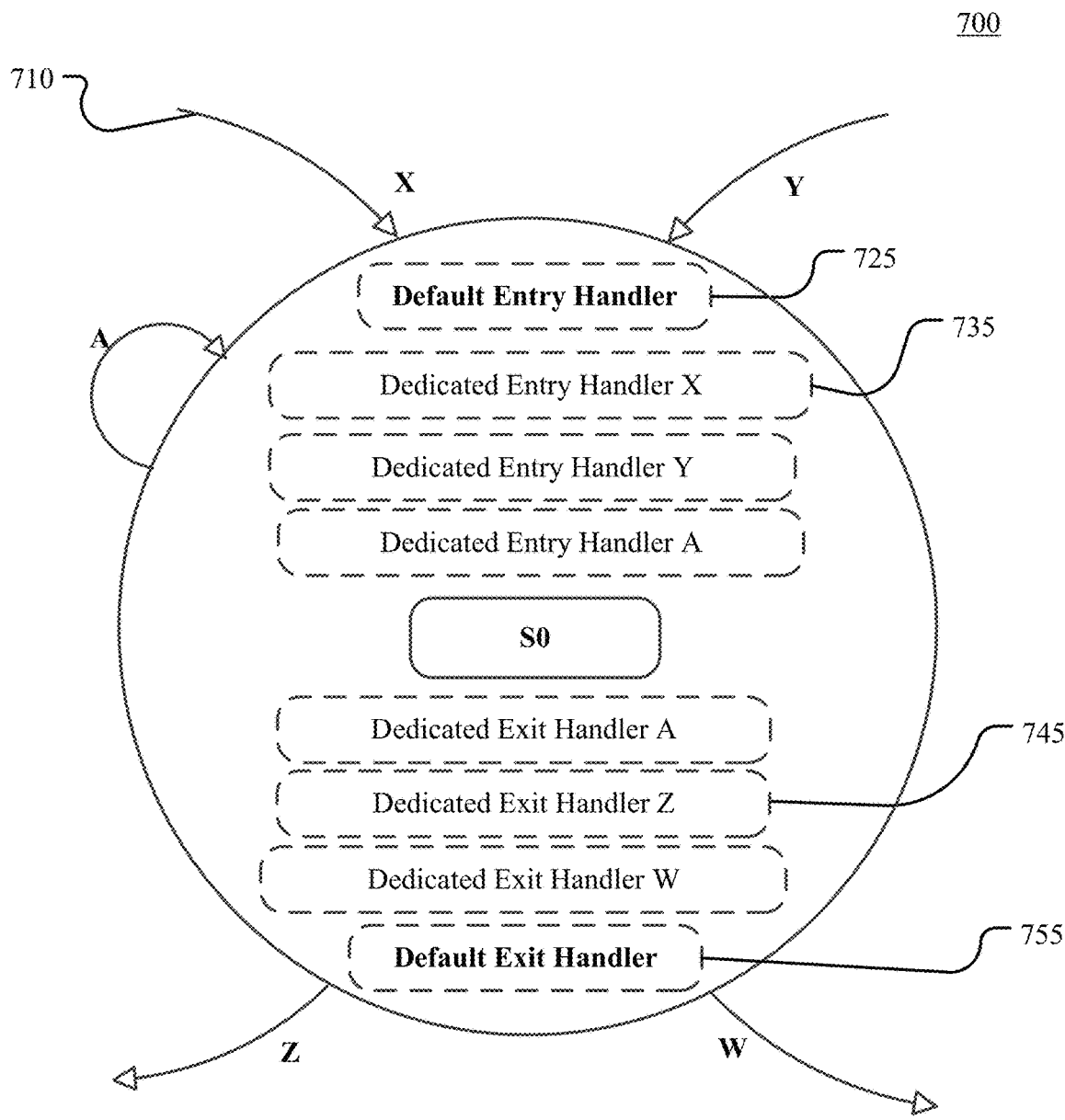
Fig. 7 – State Handlers

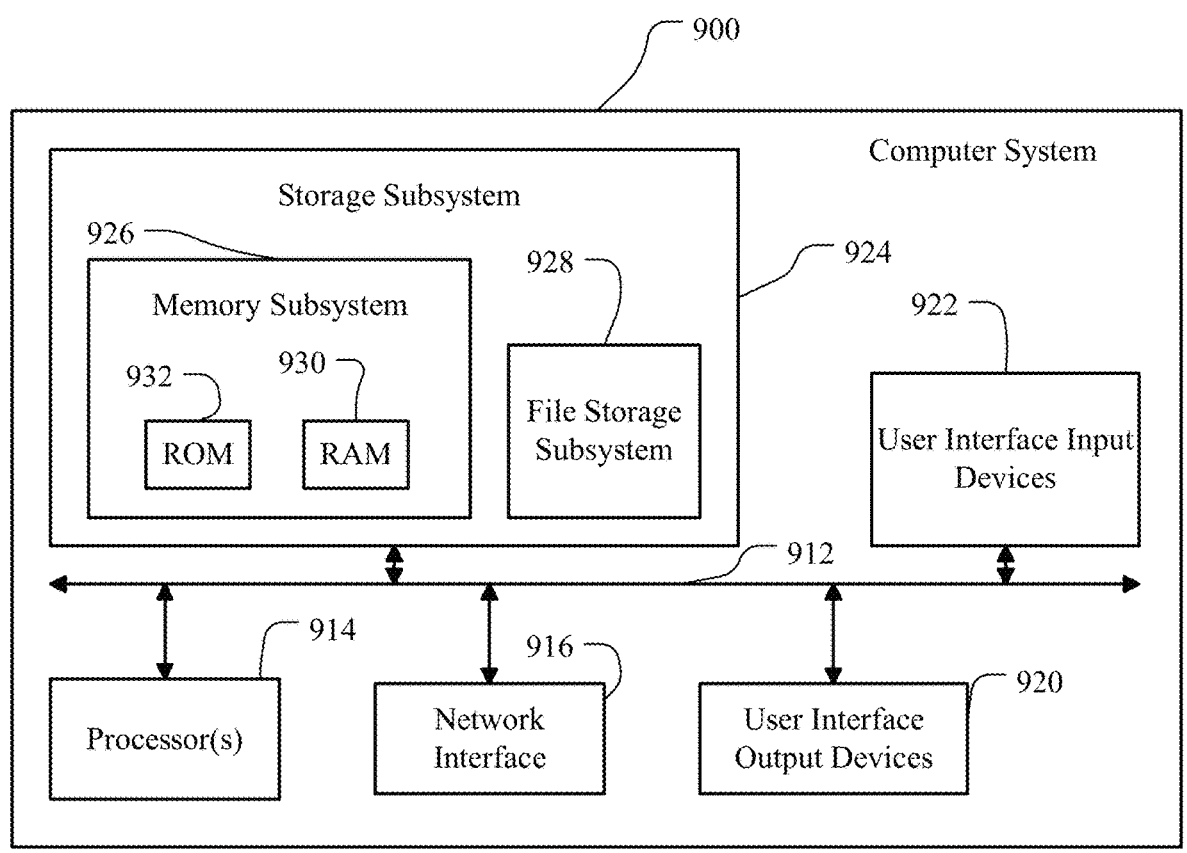
Fig. 9 – Computer System

METHOD AND SYSTEM FOR INDUCING SECURE COMMUNICATIONS BETWEEN ONE OR MORE EMULATED SERVERS AND EMULATED CLIENTS TO TEST A DEVICE THEREBETWEEN

PRIORITY DATA

This application is a continuation of U.S. application Ser. No. 15/838,047, filed Dec. 11, 2017, titled "METHOD AND SYSTEM FOR INDUCING PSEUDO HTTPS COMMUNICATIONS BETWEEN ONE OR MORE EMULATED SERVERS AND EMULATED CLIENTS TO TEST A DEVICE THEREBETWEEN," now U.S. Pat. No. 11,070,451, issued 20 Jul. 2021.

RELATED APPLICATIONS

This application is related to U.S. Pat. No. 8,996,920, issued on Mar. 31, 2015 and entitled "FINITE STATE MACHINE METHOD FOR TEST CASE GENERATION AND EXECUTION OF COMMUNICATION PROTOCOLS" and also related to U.S. Pat. No. 7,826,381, issued on Nov. 2, 2010, entitled "METHOD AND DEVICE TEST DATA STREAMS BOUND TO EMULATED DEVICES". The related applications are incorporated by reference.

FIELD OF THE INVENTION

The technology disclosed relates to testing a "device under test" (DUT) located between one or more emulated servers and emulated clients. Particularly, the technology disclosed relates to sending and receiving pseudo HTTPS communications generated by the one or more emulated servers and the emulated clients through the DUT.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Switching devices, bridging devices, routing devices, firewalls, security gateway devices and deep packet inspection devices, etc., must be thoroughly tested before they are placed in the market. For example, they must be tested in real world conditions in order to measure throughput capabilities, reliability, etc. In particular, such devices, which are typically installed in high volume infrastructures, must be capable of handling high amounts of data throughput while maintaining functionality that provides additional security and inspection. It is critical that these devices provide a high level of performance. As a result, such devices are typically put through the rigors of intensive laboratory testing before being placed in the market. Furthermore, such devices may undergo such intensive testing while they are in the field if damage is suspected, as a result of something like a power surge.

With the advent of HTTPS, which is a more secure version of HTTP (Hypertext Transfer Protocol), there has been a need to test devices that support secured communications between servers and clients. HTTPS is often referred to as "secure" HTTP. The HTTP is secure because data transmissions are encrypted using SSL or TLS protocols. The SSL (Secure Sockets Layer) protocol is the early version of security that was required by HTTPS and the TLS (Transport Layer Security) protocol is the more recent version of security required by HTTPS.

Conventionally, in order to test HTTPS devices that communicate data between servers and clients, the servers and clients must establish HTTPS sessions and then transmit packets that satisfy the HTTPS protocol. The servers and clients that communicate through the devices being tested can be emulated or they can be actual/physical servers and clients. With the throughput capabilities of modern devices under test it is more reasonable to use emulated servers. It would be unrealistic to have the number of actual/physical servers and clients in the laboratory that would be necessary to push the devices under test to their limits.

The HTTPS protocol requires very specific data exchange transactions to take place before a HTTPS session (i.e., an SSL session or a TLS session) can be established. This is typically referred to as HTTPS handshaking, which is performed in order for the servers and clients to negotiate encryption protocols and levels and exchange certificates. Once the handshaking is complete, the servers and clients will exchange encrypted data through the DUT. An example of an encrypted HTTPS session would be a consumer logging into their bank account. The initial communications between the user's computer and the bank servers are not encrypted, as they are performing the handshaking. Once the handshaking is complete, the user's credentials (i.e., login and password) are encrypted, then communicated to the server and then decrypted.

As mentioned above, HTTPS requires a level of encryption that has been negotiated between the servers and the clients. Accordingly, when the servers and clients exchange data through the device under test (DUT), the server encrypts the message that is sent to the client and then the client decrypts the message that is received. The types and levels of encryption can vary, but all of the levels and types of encryption are processor intensive and take time. In the real world, these processors intensive and time consuming procedures are a necessary tradeoff for the added level of security. However, when testing a DUT, processing power and time are valuable commodities and the more power and time consumed, the longer it takes to run a complete test on the DUT.

Therefore, a clear need arises for a method and system for inducing pseudo HTTPS communications between one or more emulated servers and emulated clients to test the DUT that eliminates the need to encrypt and decrypt the data packets sent between the one or more emulated servers and the emulated clients.

SUMMARY OF INVENTION

Aspects of the present disclosure are to address at least the above-mentioned problems and/or disadvantages and to provide at least the advantages discussed above and further described below. Accordingly, an aspect of the present disclosure is to provide methods and systems to efficiently test handling of HTTPS sessions of a plurality of clients with a plurality of servers by a switching, bridging or routing device (referred to as the "device or system under test" or "DUT"), the testing conducted by a test system having at least first and second ports that are coupled to ports on the DUT. This is achieved by inducing pseudo HTTPS communications between one or more emulated servers and emulated clients to test the DUT that removes the need to encrypt and decrypt the data packets sent between the one or more emulated servers and the emulated clients. The encrypting and decrypting of HTTPS data can be, at least, ten times more processor intensive than communicating HTTP data. As a result, this architecture is capable of pushing data through the DUT at speeds of up to 100 times faster than using conventional methods of encrypting and decrypting the data packets sent using HTTPS communications.

In accordance with an aspect of the present disclosure a method of testing handling of HTTPS sessions of a multitude of clients with a plurality of servers by a switching, bridging or routing device (referred to as the "device or system under test" or "DUT"), the testing conducted by a test system having at least first and second ports that are coupled to ports on the DUT. The method includes using a plurality of client state machines running on at least four processor cores, communicating through the DUT with a plurality of server state machines running on at least four additional processor cores. The method further includes, for each connection between (i) a client represented by a client state machine, of the plurality of client state machines, and (ii) a server represented by a server state machine, of the plurality of server state machines, setting up an HTTPS session including establishing an HTTPS session between the client and the server, negotiating an encryption protocol and exchanging keys, and completing an HTTPS handshake. The method also includes, following the setup of between 100,000 HTTPS sessions and 10,000,000 HTTPS sessions, conducting a stress test including (i) generating address and packet header information in conformance with an HTTPS standard, (ii) combining patterned payload data to the generated address and packet header to form test packets without using the negotiated encryption protocol to encrypt and decrypt the patterned payload data, and (iii) transmitting the test packets through the DUT. Additionally, the method can include and compiling and reporting results of the stress test.

In accordance with another aspect of the present disclosure, non-transitory computer readable recording medium having computer program instructions recorded thereon for testing handling of HTTPS sessions of a multitude of clients with a plurality of servers by a switching, bridging or routing device (referred to as the "device or system under test" or "DUT"). The testing is conducted by a computer system having at least first and second ports that are coupled to ports on the DUT. The computer program instructions, when executed on the computer system, cause the computer system to implement a method that includes using a plurality of client state machines running on at least four processor cores, communicating through the DUT with a plurality of server state machines running on at least four additional processor cores. The method further includes, for each connection between (i) a client represented by a client state machine, of the plurality of client state machines, and (ii) a server represented by a server state machine, of the plurality of server state machines, setting up an HTTPS session including establishing an HTTPS session between the client and the server, negotiating an encryption protocol and exchanging keys, and completing an HTTPS handshake. The method also includes, following the setup of between 100,000 HTTPS sessions and 10,000,000 HTTPS sessions, conducting a stress test including (i) generating address and packet header information in conformance with an HTTPS standard, (ii) combining patterned payload data to the generated address and packet header to form test packets without using the negotiated encryption protocol to encrypt and decrypt the patterned payload data, and (iii) transmitting the test packets through the DUT. Additionally, the method can include and compiling and reporting results of the stress test.

According to a further aspect of the present disclosure, a testing system including at least eight processor cores coupled to memory is provided. The memory is loaded with computer instructions to efficiently test handling of HTTPS sessions of a multitude of clients with a plurality of servers by a switching, bridging or routing device (referred to as the "device or system under test" or "DUT"). The testing system includes at least first and second ports that are coupled to ports on the DUT. Further, the instructions, when executed on the at least eight processors cores, implement actions including using a plurality of client state machines running on at least four processor cores, communicating through the DUT with a plurality of server state machines running on at least four additional processor cores. The method further includes, for each connection between (i) a client represented by a client state machine, of the plurality of client state machines, and (ii) a server represented by a server state machine, of the plurality of server state machines, setting up an HTTPS session including establishing an HTTPS session between the client and the server, negotiating an encryption protocol and exchanging keys, and completing an HTTPS handshake. The method also includes, following the setup of between 100,000 HTTPS sessions and 10,000,000 HTTPS sessions, conducting a stress test including (i) generating address and packet header information in conformance with an HTTPS standard, (ii) combining patterned payload data to the generated address and packet header to form test packets without using the negotiated encryption protocol to encrypt and decrypt the patterned payload data, and (iii) transmitting the test packets through the DUT. Additionally, the method can include and compiling and reporting results of the stress test.

The various above-described operations of the method are not necessarily limited to the order in which they are described. The order listed above is merely for ease of readability and understanding. Accordingly, the order listed above has no bearing on the actual order of operations performed by the method.

Other aspects, advantages, and salient features of the disclosure will become apparent to those skilled in the art from the following detailed description, which, taken in conjunction with the drawings, discloses various embodiments of the present disclosure.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 6 illustrates a state-message duple of an FSM according to an embodiment of the present disclosure;

FIG. 7 illustrates default and dedicated handlers of an FSM and illustrates a state with self-transition of an FSM according to an embodiment of the present disclosure;

FIG. 9 illustrates a block diagram of an example computer system that implements a client state machine and/or a server state machine that performs a test on a DUT.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Figure 1:
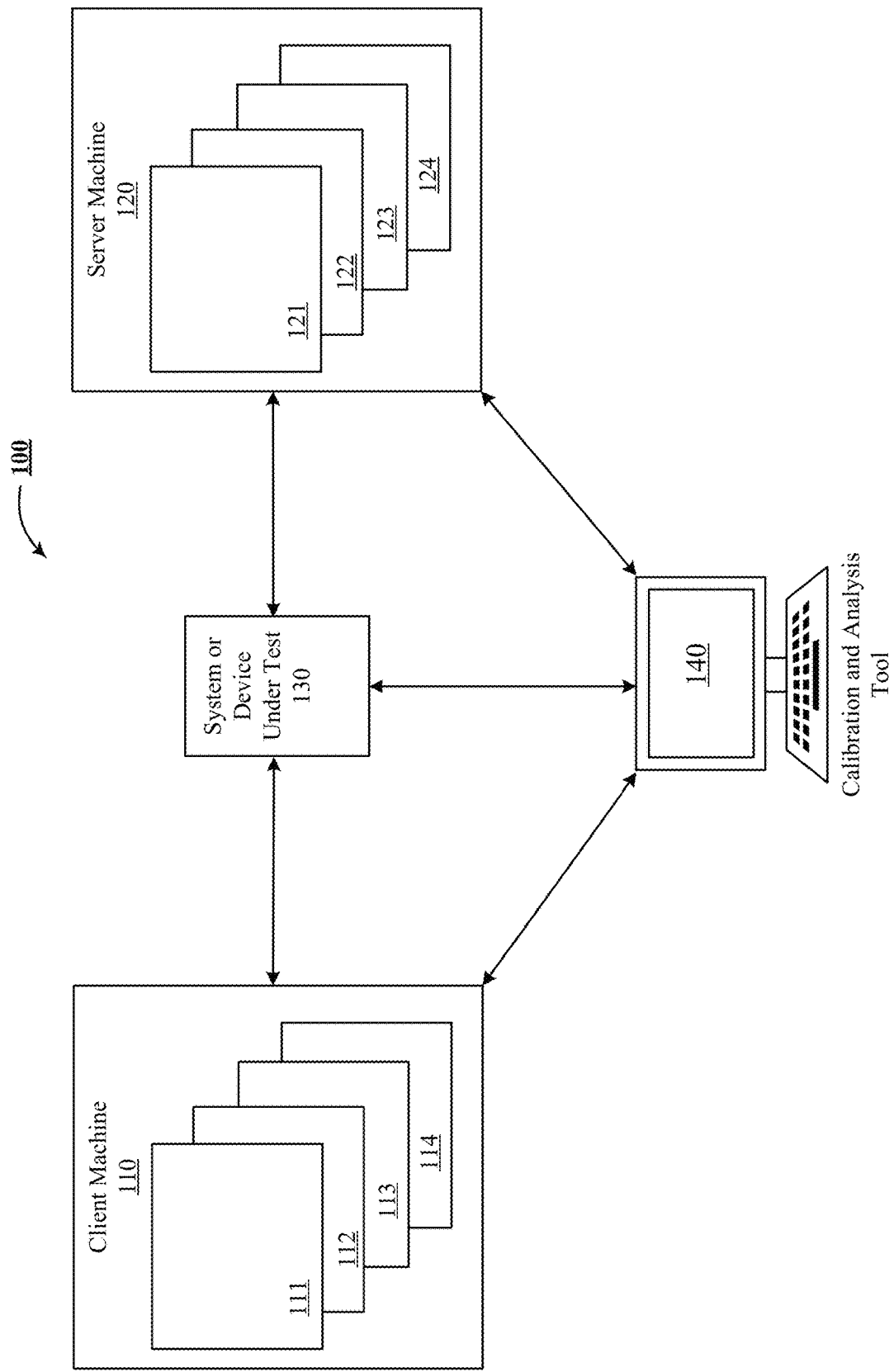
FIG. 1 illustrates a test system for testing a system or device under test ("DUT") that sits between a plurality of client state machines running on a client machine and a plurality of server state machines running on a server machine.

FIG. 1 illustrates a test system for testing a system or device under test ("DUT") that sits between a plurality of client state machines running on a client machine and a plurality of server state machines running on a server machine. Referring to FIG. 1, a test system 100 is illustrated, and includes a client machine 110, a server machine 120 and a calibration and analysis tool 140. These components of the test system 100 are for testing the "System or Device" under test, hereinafter referred to as the DUT 130.

The DUT 130 can be any device that is capable of passing information between a server and a client, a client and a client, or a server and a server. Typically, the DUT 130 will be a switching device a bridging device or a routing device. Using the technology disclosed in the present application, the test system 100 establishes and negotiates HTTPS sessions between the client machine 110 and the server machine 120 in order to test the throughput and reliability of the DUT 130. While data is being transmitted through the DUT 130, the DUT 130 itself can be performing deep packet inspection (DPI) of the data as it passes through the DUT 130. The DPI will typically only be performed during the handshaking process (e.g., the first phase, as described below with reference to FIG. 2, as opposed to during the second phase) and can be performed on the header and/or the payload of the packet received by the DUT 130. DPI is a type of computer network packet filtering that examines the data part and also the header of a packet as it passes an inspection point (i.e., the DUT 130) searching for protocol non-compliance, viruses, spam, intrusions, or defined criteria to decide whether the packet may pass or if it needs to be routed to a different destination, or, for the purpose of collecting statistical information at the Application layer of the Open Systems Interconnection model (OSI). For example, a firewall running on the DUT 130 can perform the DPI on the data packets as they pass between the client machine 110 and the server machine 120. Other aspects of the firewall can also be tested using the test system 100.

Both the client machine 110 and the server machine 120 can include hardware and software that implement features described herein. The client machine 110 and the server machine 120 may include one or more of logic arrays, memories, analog circuits, digital circuits, software, firmware and processors such as microprocessors, field programmable geared arrays (FPGAs), application-specific integrated circuits (ASICs), programmable logic devices (PLDs) and programmable logic arrays (PLAs). The hardware may be found in the chassis, card rack or integrated unit. It may include a specifically programmed and/or customized general purpose computer that is capable of communicating with the DUT 130. Both the client machine 110 and the server machine 120 may include a number of separate units that are clustered together or remote from one another.

Specifically, in an implementation, each of the client machine 110 and the server machine 120 can include a processor with at least four cores and could each include two processors, each having 16 cores. An implementation of the client machine 110 and the server machine 120 can also include 512 GB of Random Access Memory (RAM) or more.

The client machine 110 can reasonably emulate about 5 million clients, each having multiple HTTPS connections. In an implementation, it would not be unreasonable to emulate up to 10 million HTTPS client connections at a given time. These "clients" are emulated using finite state machines (FSMs), which are described in more detail below. In FIG. 1, the client machine 110 is executing client state machine 111, client state machine 112, client state machine 113 and client state machine 114. This is only an example and many more state machines can be executed. Each client state machine, as executed can represent an emulated client.

The server machine 120 can reasonably emulate about 5 servers, but should be capable of emulating hundreds of thousands of servers. Typically, the emulation of 5 servers is sufficient to establish HTTPS sessions with one million or more clients. Just like the "clients," the "servers" are emulated using a FSM. In FIG. 1, the example server machine 120 is emulating server state machine 121, server state machine 122, server state machine 123 and server state machine 124.

The calibration and analysis tool 140 can be a standard desktop computer, a laptop computer, any other type of portable computing device that is capable of connecting to at least one of the client machine 110, the server machine 120 and the DUT 130. The calibration and analysis tool 140 may also be a customized computing device running customized software. The calibration and analysis tool 140 can be capable of configuring the client machine 110, the server machine 120 and/or the DUT 130 and can monitor the DPI being performed by the DUT 130 (or performed by other devices or software) while the data packets are being transmitted between the client machine 110 and the server machine 120.

The results of the test (e.g., a stress test) being conducted on the DUT 130 can be collected by or delivered to the calibration and analysis tool 140, as well as the client machine 110 and the server machine 120. Some or all of the functionality of the calibration and analysis tool 140 can be performed by the client machine 110 and/or the server machine 120.

While FIG. 1 merely illustrates three connections to the DUT 130, it is possible to connect the client machine 110 to many ports or interfaces of the DUT 130 as well as connect the server machine 120 to many ports or interfaces of the DUT 130. The DUT 130, for example, have a separate port or ports that handle ingress and a separate port or ports that handle egress, or there can be a set of ports that handle both ingress and egress. The same is also possible for the calibration and analysis tool 140. Examples of port or interface types include IP, Multiprotocol label switching (MPLS) and Ethernet interfaces. Examples of interface configurations include IPv4, IPv6, MPLS, Ethernet, virtual local-area network (VLAN), generic routing encapsulation (GRE), backbone service instance tag (I-TAG), layer two tunneling protocol (L2TP)(v2/3), point-to-point protocol (PPP), point-to-point protocol over X (PPPoX), worldwide interoperability for microwave access (WiMax), high-level data link control (HDLC), ATM adaption layer 5 (AAL5), point of sale (POS), internet protocol security (IpSec), media access security (MacSec) (802.1ae, 802.1af), and Fiber Channel. These interface types and interface configurations can be setup and/or determined using interface configuration information that is available from the test system 100 and/or the DUT 130.

The interface configuration information depends on the interface type. For IPv4 or IPv6, the interface configuration includes a static or dynamic IP address of the emulated device and a static or dynamic gateway IP address. For the MPLS interface, the interface configuration includes at least one MPLS label. For a PPPoE or PPPoEoA interface (collectively allows with related variants, "PPoX"), the interface configuration includes at least a session ID. For the Ethernet interface, the interface configuration includes at least a MAC address. Some of this interface configuration information is supplied dynamically using a setup protocol. For IPv4 or IPv6 configuration, the set up protocol for a dynamic IP address may be DHCP or PPP. For the MPLS configuration, the setup protocol for an MPLS label may be LDP. For other interfaces, which have interface address configurations that are dynamically learned using interface set up protocols, the method exercises, as appropriate to the interface, one or more of PPPoX, L2TP, WiMax, IpSec, MacSec, or Fiber Channel. According to a further aspect of the method, the device configuration received for the test device and the DUT to set up network connectivity may be one or more industry standard routing or switching protocols known as STP (and its variants), OSPF, RIP, BGP, LDP, BFD, EOAM, IS-IS, LACP, PIM, RSVP.

Essentially, the test system 100 is configurable on many levels and is capable of interfacing with a DUT 130 using any of the interfaces and protocols from the OSI layers (i.e. layers 1-5) that are below the HTTPS layers (i.e., layers 6 and 7).

Once the client machine 110, the server machine 120, the DUT 130 and the calibration and analysis tool 140 have been set up to run the "stress test," it will be necessary to start establishing HTTPS sessions between the various emulated clients and the various emulated servers. Ideally, the "stress test" will be run in a laboratory type environment. However, the "stress test" could also be performed in the field for the purpose of determining whether a DUT deployed in the field has been damaged and needs replacement or repair.

Figure 2:
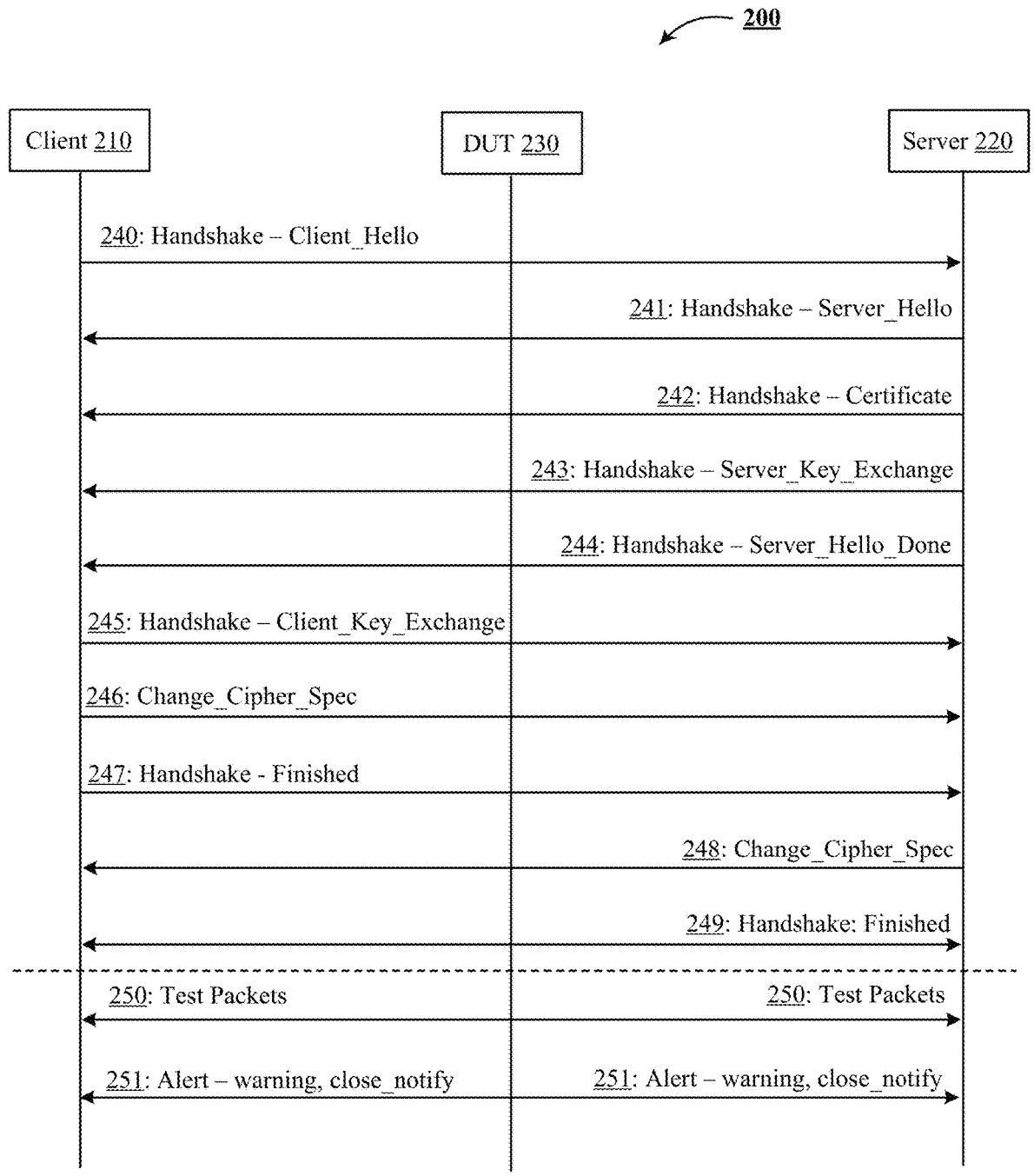
FIG. 2 illustrates a message flow between a client and a server, and through a DUT according to an embodiment of the present disclosure.

FIG. 2 illustrates a message flow between a client and a server, and through a DUT according to an embodiment of the present disclosure. Referring to FIG. 2, a data flow 200 between a client 210, a DUT 230 and a server 220 is illustrated.

This data flow 200 illustrated in FIG. 2 is similar to the HTTPS data flow outlined in RFC 2817, RFC 2818 and RFC 5246. Specifically, RFC 5246 describes the process for establishing a TLS session (e.g., an HTTPS session) between a server and a client. An HTTPS session is commonly described as having two phases. The first phase includes establishing a secure connection. In FIG. 2, the first phase covers operations 240 through 249 (i.e., the first phase take place above the dotted horizontal line in FIG. 2). It is in the first phase that the DUT 130 (see FIG. 1) or the other systems or devices are performing the DPI. The second phase includes sending and receiving encrypted data. In FIG. 2, the second phase covers operations 250 and 251 (i.e., the second phase takes place below the dotted horizontal line in FIG. 2). Note that during typical HTTPS sessions, in the second phase, the headers of the data packets are not encrypted, only the payload (e.g., application data) is encrypted. As briefly described in the BACKGROUND section, HTTPS is a secure session between a client and one or more servers. Initially unencrypted information is exchanged back and forth between the client and server in order to establish the HTTPS session, and then, traditionally, all of the data (i.e., application data) that is transmitted between the client and the server is encrypted using the previously negotiated encryption protocols.

In order to establish an HTTPS session, the client 210 will transmit, in operation 240, an initial handshake, also known as "Client_Hello" to the server 220. The client 210 is one of many clients emulated on the client machine 110 of FIG. 1 and the server 220 is one of many servers emulated on the server machine 120. The "Client_Hello" message may include a session ID, as well as other information required by the HTTPS protocol. For example, the "Client_Hello" message may include information regarding which types of Key the client 210 can accept (e.g., RSA, Diffie-Hellman, DSA, etc.), which type of Cipher the client can accept (e.g., RC4, Triple DES, AES, etc.) and which type of Hash can be used (e.g., HMAC-MD5, HMAC-SHA, etc.).

Once the server 220 receives the "Client_Hello" message, it will respond with its own handshake message "Server_Hello" in operation 241. Just like the "Client_Hello" message, the "Server_Hello" message may include additional information, such as a session ID. The "Server_Hello" message may also indicate which type of Key, Cipher and Hash will or can be used by the server 220.

The server 220 continues the handshaking procedure by sending a Certificate in operation 242, a "Server_Key_Exchange" message in operation 243 and a "Server_Hello_Done" message in operation 244. The Certificate can identify, for example, a serial number, an issuer (e.g., Verisign), validity dates, a public key, as well as a site address, and a company address.

After receiving the Certificate, the "Server_Key_Exchange" and the "Server_Hello_Done" messages, the client 210 will essentially say, ok, let's start encrypting. This is accomplished by the client 210 sending, as a handshake, a "Client_Key_Exchange" message in operation 245, a "Change_Cipher_Spec" in operation 246 and, as a handshake, a "Finished" message in operation 247. From the "Client_Key_Exchange" message the server 220 will receive a key and both the client 210 and server 220 will be able to calculate a master secret code and from the "Change_Cipher_Spec" message. The server 220 now knows to start using a specific Cipher. Note that many different types of key exchanges can be used for different types of encryption and decryption. For example, the different types of algorithms and encryption/decryption can include symmetric algorithms that use a single key, and asymmetric algorithms that use a public/private key pair. What is important is that both the server 220 and the client 210 negotiate and exchange the correct information in order to able to establish the HTTPS session.

In operation 250, the client 210 and the server 220 exchange "test packets" therebetween. In typical HTTPS communications, once encryption is negotiated (see operations 240-249), subsequent communications between the client 210 and the server 220 include (i) an unencrypted header, (ii) an encrypted command, such as GET or POST, and (iii) encrypted data that is encrypted using the negotiated encryption method.

However, this operation performed by the technology disclosed is different from typical HTTPS communications, because the "data" in the test packets is actually not encrypted. As previously described, this lack of encryption of the data allows the finite state machine that is emulating the server 220 and the finite state machine that is emulating the client 210 to receive and respond to messages much faster, because there is actually no encryption or decryption taking place. This is an efficient to test HTTPS connection capabilities of the DUT 130 without actually performing any encryption or decryption. Both the server 220 and the client 210 know that they are running in a mode so that the receipt of an encrypted payload is not expected. The finite state machines of the server 220 and the client 210 just generate the header information and the payload data based on their respective states. The DPI can still be performed during the first phase. Further, because the header information is still generated during the second phase, it is still possible to compile and report results of the stress test using the contents of the header information. The speed increase and data throughput of the test system 100 can be increase 100 times or more by eliminating the encryption and decryption steps.

The headers from the test packets exchanged between the server 220 and the client 210 still include meaningful information for the routing of the test packets and for data analysis of the stress test. Alternatively, the test system 100 may implement a lower level of encryption than that which was negotiated during the first phase of the HTTPS session. While this will not completely alleviate the need for the server 220 and the client 210 to perform encryption and decryption, it will still reduce the level of resources necessary to perform the level of encryption and decryption that was negotiated between the client 210 and the server 220. The contents of these test packets and how the test packets are generated are discussed in further detail below.

Figure 3:
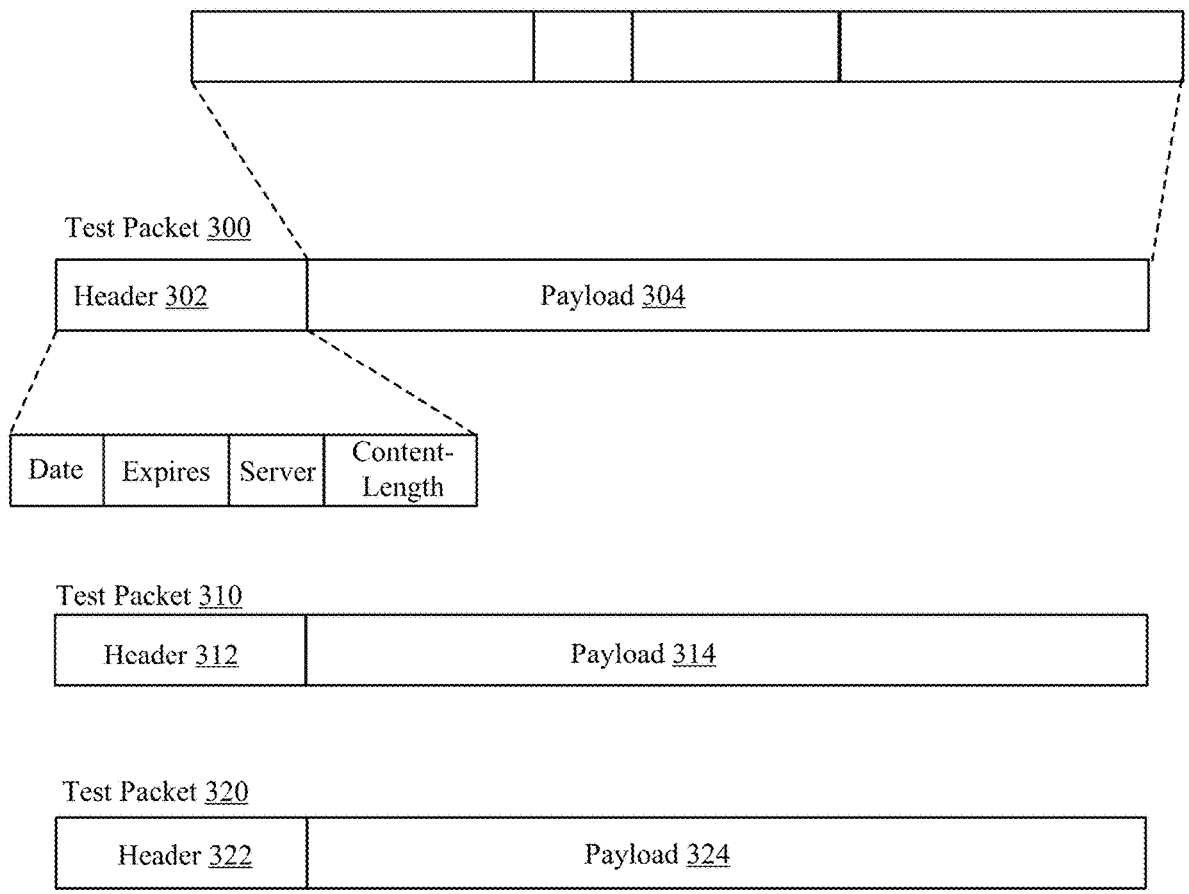
FIG. 3 illustrates HTTPS test packets and the contents thereof that are transmitted between the client and the server according to an embodiment of the present disclosure.

FIG. 3 illustrates HTTPS test packets and the contents thereof that are transmitted between the client and the server according to an embodiment of the present disclosure. Referring to FIG. 3, test packets 300, 310 and 320 are illustrated.

Test packet 300 includes a header 302 and a payload 304. There are many different types of headers (i.e., there can be multiple levels of headers) and header information that can be included in a data packet that is transmitted according to HTTP or HTTPS. RFC 2616 describes many of the different types of headers. The server 220 and the client 210, as illustrated in FIG. 3, can be configured to create whichever headers are necessary to be able to sufficiently test and record the performance of the DUT.

FIG. 3 provides an example of some header information that can be included in the header 302, such as "Date," "Expires," "Server," and "Content-Length." "Date" provides the data and the time of the beginning of the transmission, "Expires" provides the date and the time at which a response would be considered stale, "Server" identified the server that generated and transmitted the packet, and "Content-Length" identifies the length of the payload (i.e., the body) of the message. These are merely example of header information that can be exchanged. A person skilled in the art of the present application would understand the multitude of headers and header information that can be transmitted in the test packets, as well as the type of information that could be gathered from the headers and the header information to determine the results of the stress test on the DUT.

FIG. 3 also provides an illustration of a subsequent test packet 310, which includes a header 312 and a payload 314 and test packet 320, which includes a header 322 and a payload 324.

Figure 4:
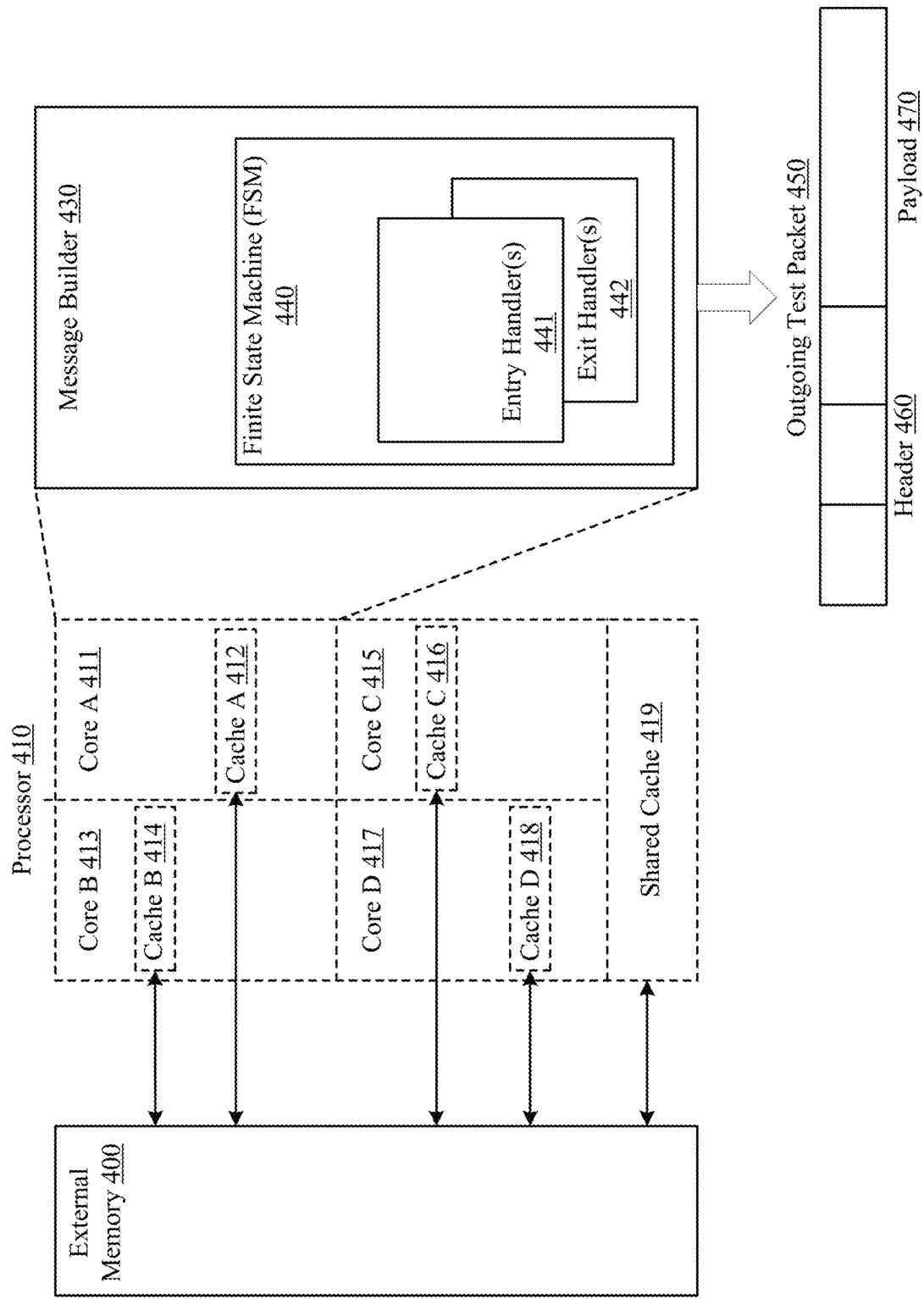
FIG. 4 illustrates a block diagram of a portion of a client machine or a server machine that generates and transmits test packets according to an embodiment of the present disclosure.

FIG. 4 illustrates a block diagram of a portion of a client machine or a server machine that generates and transmits test packets according to an embodiment of the present disclosure. Referring to FIG. 4, an external memory 400, a processor 410 and a message builder 430 are illustrated. The external memory 400 and the processor 410 are physical components and the message builder 430 is all or at least partially software that is running of the processor 410. Further, the external memory 400, the processor 410 and the message builder 430 reside on the client machine 110 and/or the server machine 120, as illustrated in FIG. 1.

The external memory 400 is memory that is external to the processor 410 and can be random access memory (RAM), solid state memory (SSD) or the like.

The processor 410 can include multiple cores. As discussed in this disclosure, four or more cores is optimal for each client machine 110 and each server machine 120 due to the high volume of throughput necessary to effectively stress the DUT 130. FIG. 4 illustrates that the processor 410 includes Core A 411, Core B 423, Core C 415 and Core D 417. As illustrated in FIG. 4, each core can have its own (on-processor) cache. Core A 411 includes (on-processor) Cache A 412, Core B 423 includes (on-processor) Cache B 414, Core C 415 includes (on-processor) Cache C 416 and Core D 417 includes (on-processor) Cache D 418. Using caching terminology, Caches A, B, C and D (412, 414, 416 and 418) are level 1 or L1 cache, that is local to their respective cores. Processor 410 also includes a shared cache 419, which can be considered level 2 or L2 cache, which could be on-processor or off-processor cache. Level 3 or L3 cache may also be present in the system. The shared cache 419 can be shared between all 4 cores (i.e., Core A 411, Core B 413, Core C 415 and Core D 417). Further, the shared cache 419 can include multiple caches. For example, a first cache of the shared cache 419 can be designated to be shared between two cores, a second cache of the shared cache 419 can be designated between the other two cores and a third cache of the shared cache 419 can be shared between all four cores. Additionally, as previously described, the processor 410 can include more than four cores and there can be multiple processors 410 on the client machine 110 and/or the server machine 120.

Hereinafter, the term "Caches" refers to one or more of Cache A 412, Cache B 414, Cache C 416, Cache D 418 and the shared cache 419 (and all of the potential sub-caches thereof). In order to efficiently emulate millions of client/server HTTPS sessions and exchange data between the servers and clients at a rate that will stress the DUT 130, the Caches can be utilized to pre-fetch the data necessary for performing operations 240 through 251, as illustrated in FIG. 2, from the external memory 400 or from other sources. As illustrated in FIG. 4, the Caches are capable of pre-fetching data from the external memory 400. While it is not illustrated, each of the Caches may also be able to exchange data therebetween. Continuous pre-fetching of the data from the external memory 400 and other sources allows the Caches to remain full with data that can be used by the cores. FIG. 4 is only a high-level block diagram and does not illustrate each of the possible bus connections and data exchanges between the various elements illustrated therein.

By using pre-fetched data it is possible for the code or codebase that is needed by the processor 410 to remain in the Caches. As a result, there will not be a need to generate a new payload for every data exchange. The pre-fetching makes it possible to get canned data or messages from the external memory 400 or other sources, such that the canned data or messages can be used as the payload of the messages exchanged between the server machine 120 and the client machine 110. C++ extensions can be used by the software running on the server machine 120 and the client machine 110 to implement an efficient method for pre-fetching the data for the Caches. Other types of extensions may also be used to implement the pre-fetching. Alternatively, the payloads of the messages exchanged between the server machine 120 and the client machine 110 can come from the external memory 400 or other sources. However, such an implementation could about 7 times (or more) slower that the pre-fetching. The pre-fetching will just require additional programming considerations up front. A person of ordinary skill in the art may understand that the type of data generation required for the first phase of HTTPS communication (see FIG. 2) can be referred to as flexible mode data generation and the type of data generation required for the second phase of HTTPS communication, as implemented by the present technology can be either flexible mode data generation (i.e., not pre-fetching data into the Caches for data generation) or inflexible mode data generation (i.e., using pre-fetching data, to place the appropriate data into the Caches). Again, the pre-fetching of the data eliminates the need to take the time to access the external memory 400 or other sources. The necessary data can be pre-fetched and queued into the Caches for fast processing by the processor 410 and output by the message builder 430.

Additionally, each of the cores is capable of executing software that builds the messages or "test packets" to be exchanged. FIG. 4 illustrates that software executed on Core A 411 (i.e., the message builder 430) initiates a finite state machine (FSM) 440 and generates an outgoing test packet 450 based on the state of the FSM 440. The message builder 430 is capable of implementing multiple FSMs 440, where each FSM can represent a single emulated server or a single emulated client. As outlined in this document, the client machine 110 is capable of emulating around 5 million clients and the server machine 120 is capable of emulating hundreds, if not thousands of servers, where each emulated client is capable of establishing multiple HTTPS sessions and each emulated server is capable of establishing thousands, if not millions of HTTPS sessions. Each FSM 440 includes one or more entry handlers 441 and one or more exit handlers 442. The entry handlers 441 handle the entry of a message and can cause a state of the FSM 440 to change and the exit handlers 442 handle the exit of a massage based on the new state of the FSM 440. The functionality and operations of the FSM 440 will be understood by a person who is skilled in the art of finite state machines. The basic operations of finite state machines are described in more detail below with reference to FIGS. 5, 6 and 7.

The message builder 430, using the pre-fetched data from the Caches and using the entry and/or exit messages of the FSM 40, creates the outgoing test packet 450. The outgoing test packet 450 is created by generating address and header information that is conformance with the HTTPS standard and by combining patterned payload data to the generated address and packet header. As illustrated, the outgoing test packet 450 includes a header 460 and the payload 470. Even though the test packet 450 is transmitted using an HTTPS session, the payload 470 is either not encrypted at all or is encrypted at a lower level than that which was negotiated between the client and the server. The header 460 includes address and header information and the payload 470 can include unencrypted data that has no meaning or patterned data that can be used for further analysis and testing of the performance of the DUT 130 while the stress test is being performed. The outgoing test packet 450 is transmitted by the client machine 110 to the DUT 130 and then to the server machine 120, or is transmitted by the server machine 120 to the DUT 130 and then to the client machine 110. As this process is being carried out for millions of HTTPS sessions, the results of the stress test are being compiled by the calibration and analysis tool 140 (see FIG. 1), or any other device as described above.

Figure 8:
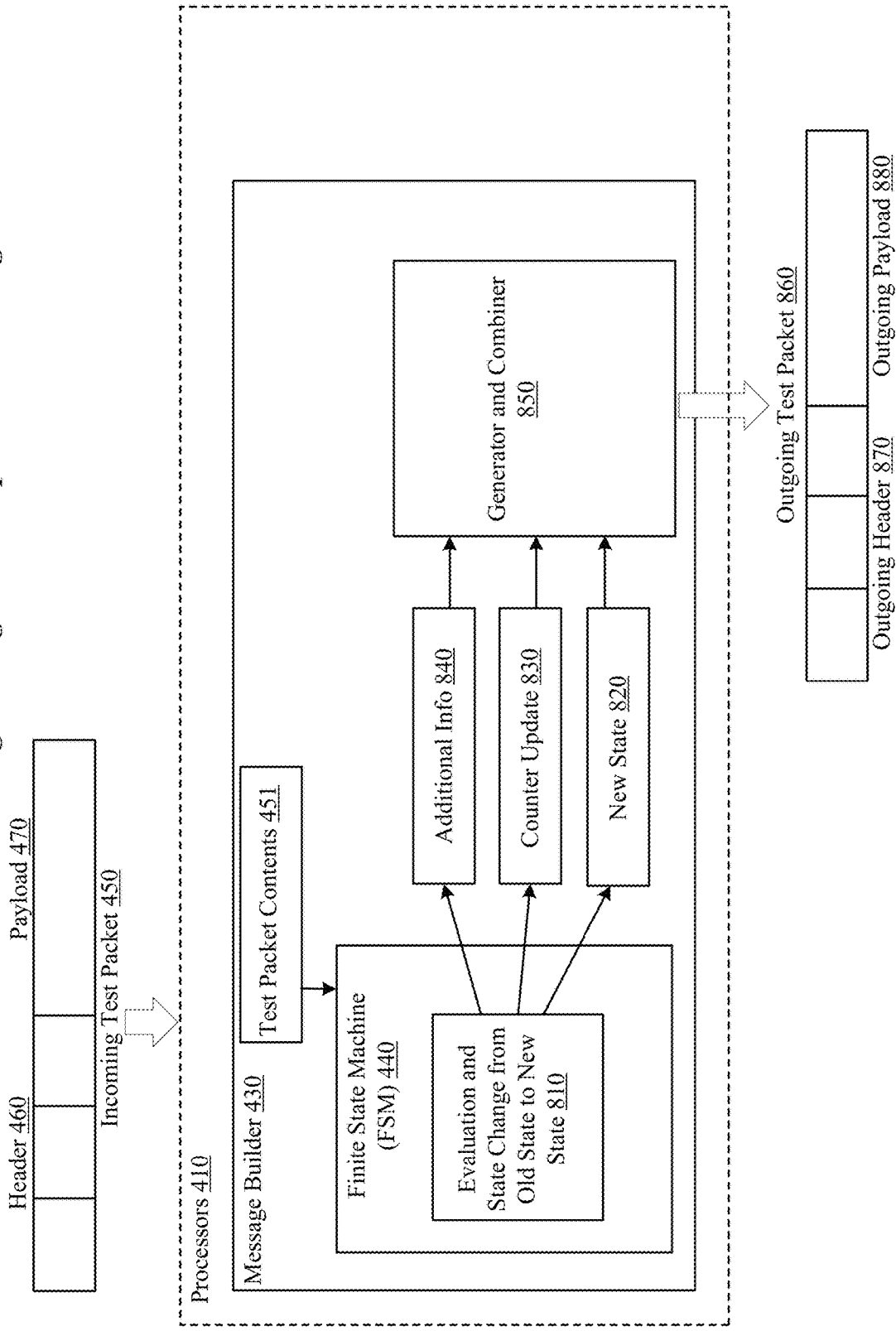
FIG. 8 illustrates a block diagram of a portion of client machine or a server machine that receives a test packet and generates an outgoing test packet in response.

FIG. 8 describes what happens during the stress test after the client machine 110 or the server machine 120 receives a test packet. However, before this is described, finite state machines are described in further detail below.

Figure 5:
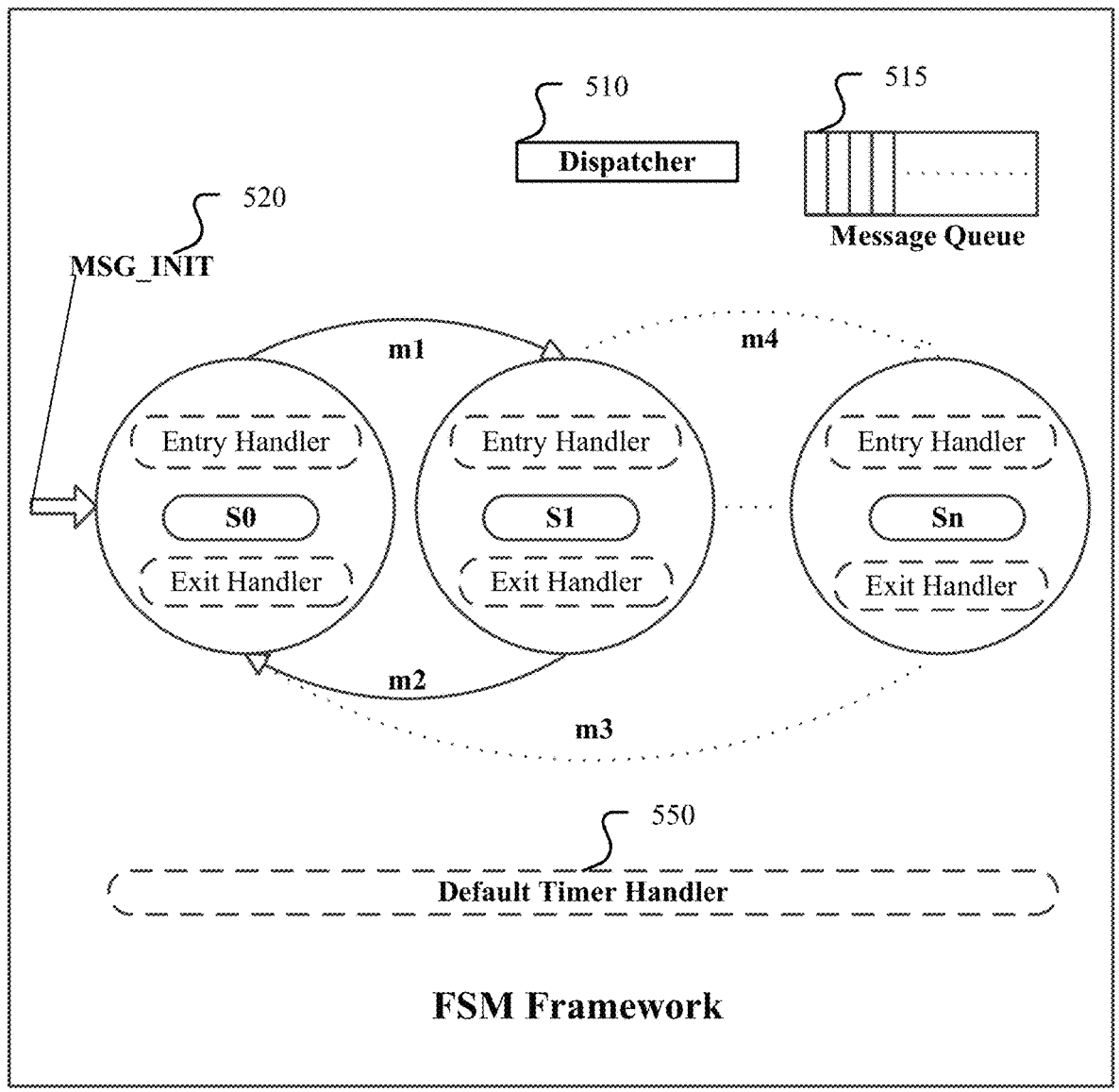
FIG. 5 illustrates a general framework of an example finite state machine (FSM) as utilized in FIG. 4 according to an embodiment of the present disclosure.

FIG. 5 illustrates a general framework of an example finite state machine (FSM) as utilized in FIG. 4 according to an embodiment of the present disclosure. Referring to FIG. 5, a general framework of an FSM 500 is illustrated. The FSM 500 can emulate, for example, a client or a server. As disclosed above, in order to test the handling of the HTTPS sessions by the DUT, it is reasonable to emulate up to 5 million clients, each carrying out multiple HTTPS sessions and it is reasonable to emulate hundreds of thousands of servers, each carrying out many HTTPS sessions. This framework of the FSM 500 only refers to one finite state machine, but in view of the large number of client and servers emulated, the client machine 110 and the server machine 120 can be emulating millions of FSMs 500.

The FSM 500 has a number of states and behaviors that are modeled by exit, entry or/and timer handlers. In addition to the states, an FSM has a number of transitions that lets the FSM switch from a current state to a different state based on the input message. An FSM can use several components for message processing including a message queue 515 and dispatcher 510. The message queue enqueues incoming messages in a first in, first out (abbreviated FIFO) order. The dispatcher 510 dequeues the messages from the message queue in a FIFO manner to the current state and invokes the respective handlers for each state. If the entry, exit, and/or timer handlers are invoked and completed, the dispatcher checks the return Boolean value of these handlers. If the value is "False", this means that the FSM is still running and the dispatcher continues to dequeue and dispatch messages. However, if the return value is "True", the dispatcher stops dispatching any queued messages, and the FSM is considered to be complete.

In the FSM 500, the MSG_INIT 520 is received by the initial state S0 that comprises of an exit handler and entry handler. The state S1 is an intermediate state, also comprising an exit handler and entry handler. The state Sn represents any other states that the FSM 500 may have along with its exit handler and entry handler. If the message is a timer expiry message, the default timer handler 550 is invoked FIG. 6 illustrates a state-message duple of an FSM according to an embodiment of the present disclosure. Referring to FIG. 6 a representation of example state-message duple of an FSM 600 is illustrated.

An FSM 600 can include a special state called the initial state 615, which the FSM 600 enters upon initialization or start-up. When the FSM 600 is initialized, a message called MSG_INIT 610 is enqueued into a message queue 515 and sent to the FSM 600. Upon receipt of this message, the system calls exit handler of the initial state, which contains the instructions for exiting the initial state.

FIG. 7 illustrates default and dedicated handlers of an FSM and illustrates a state with self-transition of an FSM according to an embodiment of the present disclosure. Referring to FIG. 7, example dedicated handlers of an FSM 700 are illustrated.

These state handlers are used to process an incoming message 710, received while in a state and when exiting or entering it. One or more exit handlers and entry handlers model the behaviors related to the states of a FSM. The so-called default exit handler 755 or default entry handler 725 are methods, function-calls or similar blocks of code that contain instructions to describe and implement the state behaviors. Invoking these handlers serves to invoke the state behaviors. A state can also be modeled to handle specific messages by invoking either the so-called dedicated exit handler 745 or dedicated entry handler 735 or both. Messages X and Y cause a transition to enter the state; hence they only have a dedicated entry handler. Messages Z and W cause a transition to exit the state; hence they only have a dedicated exit handler.

FIG. 7 also illustrates a self-transition within a state, where message A is a self-transition that is responsive to another message and where message A has its own pair of dedicated exit and entry handlers.

FIG. 8 illustrates a block diagram of a portion of a client machine or a server machine that receives a test packet and generates an outgoing test packet in response. Referring to FIG. 8, a message builder 430 that receives an incoming test packet 450 and builds and transmits an outgoing test packet 860 is illustrated. The message builder 430 and the processor 410 executing the message builder 430 are described above with reference to FIG. 4. Therefore, redundant descriptions thereof are omitted here.

The incoming test packet 450 includes a header 460 and a payload 470, which are described in more detail above. The incoming test packet 450 is transmitted from the client machine 110 or the server machine 120, through the DUT 130, and is received here by the client machine 110 or the server machine 120. This test packet 450 can be the same outgoing test packet 450 that is described with reference to FIG. 4. Even though the incoming test packet 450 is transmitted and received using an HTTPS session, the payload 470 is either not encrypted at all or is encrypted at a lower level than that which was negotiated between the client and the server.

The message builder 430, which is emulating a client or a server using the FSM 440, receives the incoming test packet 450 so that the FSM 440 can change its state based on information contained in the header 460 and/or the payload 470. As illustrated in FIG. 8, the FSM 440 performs an evaluation of the received incoming test packet 450 and performs a state change from an old state to a new state 810. Based on the net state, the FSM 440, using one or more exit handlers, outputs the new state 820 or a new state message, a counter update 830, and additional information 840. The counter update 830 can simply be an update of a counter that is keeping track of the number of test packets that have been received and the number of test packets that have been transmitted. The additional information 840 can be any information that would be beneficial to analyzing the performance of the DUT 130 during the stress test, as well as the performance of the client machine 110 and the server machine 120. Information from the new state 820, the counter update 830 and the additional information 840 can be received by a generator and combiner 850 that generates and combines the received information to generate the outgoing test packet 860 that includes an outgoing header 870 and an outgoing payload 880.

The generator and combine 850 merely represents operations performed by the processor 410 (see FIG. 4) and other hardware and software components of the client machine 110 and/or server machine 120.

FIG. 9 illustrates a block diagram of an example computer system that implements a client state machine and/or a server state machine that performs a test on a DUT. Referring to FIG. 9, an example computer system 900 is illustrates. This example computer system 900 can perform the operations of the client machine 110, as illustrated in FIG. 1 and/or the operations of the server machine 120, as illustrated in FIG. 1. For example, first and second example computer systems 900 can be used to perform the operations of the client machine 110 and the server machine 120, respectively. Alternatively, one single example computer system 900 can perform the operations of the client machine 110, the server machine 120 and optionally the calibration and analysis tool 140, as illustrated in FIG. 1.

The computer system 900 can include one or more processors 914. If the computer system 900 is performing the operations of both the client machine 110 and the server machine 120, then the computer system 900 should ideally have 8 processor cores. However, it can be possible to implement the present technology with few than 8 processor cores. As described with reference to FIG. 4 the processors 914 can include an individual cache for each core as well as a shared cache for the rapid generation and combination of data for creating the test packets. The processors 914 communicate with a number of peripheral devices via bus subsystem 912. These peripheral devices may include a storage subsystem 924 including, for example, a memory subsystem 926 and a file storage subsystem 928, user interface input devices 922, user interface output devices 920, and a network interface 916.

The user interface input and user interface output devices 920, 922 allow user interaction with computer system 900. Network interface 916 provides an interface to outside networks to communicate with other computer systems. The bus subsystem 912 also includes the ports necessary to communicate with the ports on the DUT and to interface with the calibration and analysis tool 140.

User interface input devices 922 may include: a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 900 to the user or to another machine or computer system.

Storage subsystem 924 stores programming and data constructs that provide the functionality of some or all of the modules and methods described herein. These software modules are generally executed by the processors 914 alone or in combination with other processors.

Memory subsystem 926 used in the storage subsystem can include a number of memories including a main random-access memory (RAM) 930 for storage of instructions and data during program execution and a read only memory (ROM) 932 in which fixed instructions are stored. The file storage subsystem 928 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 928 in the storage subsystem 924, or in other machines accessible by the processors 914.

Bus subsystem 912 provides a mechanism for letting the various components and subsystems of the computer system 900 communicate with each other as intended. Although bus subsystem 912 is shown schematically as a single bus, alternative implementations of the bus subsystem may use multiple busses.

Computer system 900 can be of varying types including a workstation, server, computing cluster, blade server, server farm, or any other data processing system or computing device. Due to the ever-changing nature of computers and networks, the description of computer system 900 is intended only as one example. Many other configurations of the computer system 900 are possible having more or fewer components than the computer system depicted in FIG. 9.

Some Particular Embodiments

The technology disclosed can be practiced as a computer implemented method of testing handling of HTTPS sessions of a plurality of clients with a plurality of servers by a switching, bridging or routing device (referred to as the "device or system under test" or "DUT"). It can also be practiced as a testing system including features disclosed or as an article of manufacture, such as a non-transitory computer-readable recording medium including computer program instructions adapted to carry out the methods described.

One embodiment is a method of testing handling of HTTPS sessions of a plurality of clients with a plurality of servers the by a switching, bridging or routing device (referred to as the "device or system under test" or "DUT"). The testing is conducted by a test system having at least first and second ports that are coupled to ports on the DUT. The environment in which this method is applied may also include a collection of DUTs that would form the "system under test." The method operates on a plurality of client state machines and a plurality of server state machines. The method includes using a plurality of client state machines running on at least four processor cores, communicating through the DUT with a plurality of server state machines running on at least four additional processor cores. For each connection established between (i) a client represented by a client state machine, of the plurality of client state machines, and (ii) a server represented by a server state machine, of the plurality of server state machines, an HTTPS session is set up. The HTTPS session is set up by establishing an HTTPS session between the client and the server, negotiating an encryption protocol and exchanging keys, and completing an HTTPS handshake.

The method also includes, following the setup of between 100,000 HTTPS sessions and 10,000,000 HTTPS sessions, conducting a stress test. This stress test can include generating address and packet header information in conformance with an HTTPS standard, combining patterned payload data to the generated address and packet header to form test packets without using the negotiated encryption protocol to encrypt the patterned payload data, and transmitting the test packets through the DUT. Further, the method includes compiling and reporting results of the stress test.

In one embodiment the stress test can include, prior to the combining to form the test packets, pre-fetching the patterned payload data into a processor cache of the at least four processor cores and then performing the combining without latency for retrieval of the patterned payload data from memory coupled to the at least four processor cores by a bus external to packaging of the at least four processor cores.

An embodiment can also include the processor cache into which the patterned payload data is pre-fetched being a cache that is local to only one processor core of the at least four processor cores. The processor cache into which the patterned payload data is pre-fetched is a cache that can also be local to only two processor cores of the at least four processor cores. The processor cache into which the patterned payload data is pre-fetched can be a shared cache that is shared between the at least four processor cores.

In one embodiment the client state machines can perform the generating, the combining and the transmitting operations of setting up the HTTPS session. Further, the server state machines can perform the generating, the combining and the transmitting operations of setting up the HTTPS session. Additionally, both the server state machines and the client state machines can perform the generating, the combining and the transmitting operations of setting up the HTTPS session.

An embodiment can also include setting up network connectivity between the plurality of client state machines, the DUT and the server state machines using a pre-selected or automatically selected device configuration of interface types and interface configurations. Examples of interface configurations include IPv4, IPv6, MPLS, Ethernet, VLAN, GRE, ITAG, L2TP(v2/3), PPP, PPPoX, WiMax, HDLC, AAL5, POS, IpSec, MacSec (802.1ae, 802.1af), and Fiber Channel. For the IPv4 or IPv6 interface types, the interface configuration includes a static or dynamic IP address of the emulated device and a static or dynamic gateway IP address. For the MPLS interface type, the interface configuration includes at least one MPLS label. For the PPPoX interface type, the interface configuration includes at least a session ID, and for the Ethernet interface type, the interface configuration includes at least a MAC address.

Additionally, in an embodiment, for the IPv4 or IPv6 interface type, a setup protocol for a dynamic IP address is one or more of DHCP or PPP, for the MPLS interface type, the setup protocol for an MPLS label is one or more of LDP, BGP or RSVP, and for other interfaces, which have interface address configurations that are dynamically learnt using interface setup protocols, the method exercises, as appropriate to the interface, one or more of PPPoX, L2TP, WiMax, IpSec, MacSec, or Fiber Channel.

In one embodiment the device configuration is received for the client state machines, the DUT and the server state machines and is one or more industry standard routing or switching protocols known as STP (and its variants), OSPF, RIP, BGP, LDP, BFD, EOAM, IS-IS, LACP, PIM, and RSVP.

The method, in one embodiment, can further include configuring one or more of (i) the plurality of client state machines, (ii) the DUT and (iii) the server state machines using a calibration and analysis tool. Further, in an embodiment, the method can include the calibration and analysis tool interfacing with one or more of (i) the plurality of client state machines, (ii) the DUT and (iii) the server state machines and performs quality of service (QoS) measurements. Additionally, the conducting of the stress test can further include at least one of (i) performing deep packet inspection on the test packets as they pass through the DUT and (ii) receiving results of deep packet inspection performed on the test packets as they pass through the DUT.

A device embodiment (e.g., a testing system embodiment) of the technology disclosed includes at least eight processor cores coupled to memory, the memory loaded with computer instructions to test handling of HTTPS sessions of a multitude of clients with a plurality of servers by a switching, bridging or routing device (referred to as the "device or system under test" or "DUT"). The testing system can further include at least first and second ports that are coupled to ports on the DUT. The environment in which this testing system operates may also include a collection of DUTs that would form the "system under test." The testing system includes a plurality of client state machines and a plurality of server state machines.

The computer instructions of the system, when executed on the at least eight processors cores, implement various actions such as using a plurality of client state machines running on at least four of the eight processor cores, communicating through the DUT with a plurality of server state machines running on at least four additional processor cores of the eight processor cores. The various actions can also include for each connection between (i) a client represented by a client state machine, of the plurality of client state machines, and (ii) a server represented by a server state machine, of the plurality of server state machines, setting up an HTTPS session. This setting up of the HTTPS session may include establishing an HTTPS session between the client and the server, negotiating an encryption protocol and exchanging keys, and completing an HTTPS handshake.

The various actions, implemented by the computer instructions of the testing system can also include following the setup of between 100,000 HTTPS sessions and 10,000,000 HTTPS sessions, conducting a stress test. The stress test can include generating address and packet header information in conformance with an HTTPS standard, combining patterned payload data to the generated address and packet header to form test packets without using the negotiated encryption protocol to encrypt the patterned payload data, and transmitting the test packets through the DUT. The various actions can also include compiling and reporting results of the stress test.

In one embodiment the stress test can include, prior to the combining to form the test packets, pre-fetching the patterned payload data into a processor cache of the at least four processor cores and then performing the combining without latency for retrieval of the patterned payload data from memory coupled to the at least four processor cores by a bus external to packaging of the at least four processor cores.

An embodiment can also include the processor cache into which the patterned payload data is pre-fetched being a cache that is local to only one processor core of the at least four processor cores. The processor cache into which the patterned payload data is pre-fetched is a cache that can also be local to only two processor cores of the at least four processor cores. The processor cache into which the patterned payload data is pre-fetched can be a shared cache that is shared between the at least four processor cores.

In one embodiment the client state machines can perform the generating, the combining and the transmitting operations of setting up the HTTPS session. Further, the server state machines can perform the generating, the combining and the transmitting operations of setting up the HTTPS session. Additionally, both the server state machines and the client state machines can perform the generating, the combining and the transmitting operations of setting up the HTTPS session.

An embodiment can also include setting up network connectivity between the plurality of client state machines, the DUT and the server state machines using an appropriate device configuration of interface types and interface configurations. Examples of interface configurations include IPv4, IPv6, MPLS, Ethernet, VLAN, GRE, ITAG, L2TP (v2/3), PPP, PPPoX, WiMax, HDLC, AAL5, POS, IpSec, MacSec (802.1ae, 802.1af), and Fiber Channel. For the IPv4 or IPv6 interface types, the interface configuration includes a static or dynamic IP address of the emulated device and a static or dynamic gateway IP address. For the MPLS interface type, the interface configuration includes at least one MPLS label. For the PPPoX interface type, the interface configuration includes at least a session ID, and for the Ethernet interface type, the interface configuration includes at least a MAC address.

Additionally, in an embodiment, for the IPv4 or IPv6 interface type, a setup protocol for a dynamic IP address is one or more of DHCP or PPP, for the MPLS interface type, the setup protocol for an MPLS label is one or more of LDP, BGP or RSVP, and for other interfaces, which have interface address configurations that are dynamically learnt using interface setup protocols, the various actions exercise, as appropriate to the interface, one or more of PPPoX, L2TP, WiMax, IpSec, MacSec, or Fiber Channel.

In one embodiment the device configuration is received for the client state machines, the DUT and the server state machines and is one or more industry standard routing or switching protocols known as STP (and its variants), OSPF, RIP, BGP, LDP, BFD, EOAM, IS-IS, LACP, PIM, and RSVP.

The various actions, in one embodiment, can further include configuring one or more of (i) the plurality of client state machines, (ii) the DUT and (iii) the server state machines using a calibration and analysis tool. Further, in an embodiment, the various actions can include the calibration and analysis tool interfacing with one or more of (i) the plurality of client state machines, (ii) the DUT and (iii) the server state machines and performs quality of service (QoS) measurements. Additionally, the conducting of the stress test can further include at least one of (i) performing deep packet inspection on the test packets as they pass through the DUT and (ii) receiving results of deep packet inspection performed on the test packets as they pass through the DUT.

The article of manufacture embodiments may be combined with the aspects and options of the methods and the testing system which are described above. All of those aspects and options apply equally to articles of manufacture that include program instructions to practice the method or to construct the device as they do to the method or device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim:

1. A method of testing handling of secure communication sessions of a plurality of clients with a plurality of servers by a device under test (DUT), the method including:
for each connection between (i) a client of the plurality of clients, and (ii) a server of the plurality of servers, setting up a secure communication session through the DUT, the setting up of the secure communication session including:
establishing a secure communication session between the client and the server through the DUT; and
negotiating an encryption protocol for the secure communication session; and
following the setup of multiple concurrent secure communication sessions, conducting a stress test on the DUT using the multiple secure communication sessions, the stress test including:
combining
payload data that is not encrypted in accordance with the negotiated encryption protocol for the established secure communication session with
address and packet header information generated in conformance with the established secure communication session
to form test packets; and
transmitting the test packets through the DUT between the clients and the servers in the multiple concurrent secure communication sessions.

2. The method of claim 1, wherein the stress test further includes, prior to the combining to form the test packets, pre-fetching the payload data into a processor cache and then performing the combining without latency for retrieval of the payload data from memory coupled to a processor by a bus external to packaging of the processor.

3. The method of claim 2, wherein the processor cache into which the payload data is pre-fetched is on-processor cache that is local to only one processor core.

4. The method of claim 2, wherein the processor cache into which the payload data is pre-fetched is on-processor cache that is shared by multiple processor cores.

5. The method of claim 2, wherein the processor cache into which the payload data is pre-fetched is on-processor cache that is shared between processor cores.

6. The method of claim 1, wherein both the plurality of servers and the plurality of clients perform the combining and the transmitting.

7. The method of claim 1, further including setting up network connectivity between the plurality of clients, the DUT and the servers using a pre-selected or automatically selected device configuration of interface types and interface configurations.

8. The method of claim 7, wherein the interface types are one or more of IPv4, IPv6, MPLS, Ethernet, VLAN, GRE, ITAG, L2TP(v2/3), PPP, PPPoX, WiMax, HDLC, AAL5, POS, IpSec, MacSec (802.1ae, 802.1af), and Fiber Channel.

9. The method of claim 8, wherein:
for the IPv4 or IPv6 interface types, the interface configurations include a static or dynamic IP address of one or more of the clients and the servers and a static or dynamic gateway IP address;
for the MPLS interface type, the interface configurations include at least one MPLS label;
for the PPPoX interface type, the interface configurations include at least a session ID; and
for the Ethernet interface type, the interface configuration includes at least a MAC address.

10. The method of claim 9, wherein:
for the IPv4 or IPv6 interface type, a setup protocol for a dynamic IP address is one or more of DHCP or PPP;
for the MPLS interface type, the setup protocol for an MPLS label is one or more of LDP, BGP or RSVP; and
for other interfaces, which have interface address configurations that are dynamically learnt using interface setup protocols, the method includes exercising, as appropriate to the interface, one or more of PPPoX, L2TP, WiMax, IpSec, MacSec, or Fiber Channel.

11. The method of claim 9, wherein the device configuration is received for the clients, the DUT and the servers and is one or more industry standard routing or switching protocols known as STP (and its variants), OSPF, RIP, BGP, LDP, BFD, EOAM, IS-IS, LACP, PIM, and RSVP.

12. The method of claim 1, further comprising configuring one or more of (i) the plurality of clients, (ii) the DUT and (iii) the servers using a calibration and analysis tool.

13. The method of claim 12, wherein the calibration and analysis tool interfaces with one or more of (i) the plurality of clients, (ii) the DUT and (iii) the servers and performs quality of service (QoS) measurements.

14. The method of claim 1, wherein conducting of the stress test further includes at least one of (i) performing deep packet inspection on the test packets as they pass through the DUT and (ii) receiving results of deep packet inspection performed on the test packets as they pass through the DUT.

15. A non-transitory computer-readable recording medium having computer program instructions recorded thereon for testing handling of secure communication sessions of a plurality of clients with a plurality of servers by device under test (DUT), the computer program instructions, when executed on a computer system, cause the computer system to implement a method comprising:
for each connection between (i) a client of the plurality of clients, and (ii) a server of the plurality of servers, setting up a secure communication session through the DUT, the setting up of the secure communication session including:
establishing a secure communication session between the client and the server through the DUT; and
negotiating an encryption protocol for the secure communication session; and
following the setup of multiple concurrent secure communication sessions, conducting a stress test on the DUT using the multiple secure communication sessions, the stress test including:
combining
payload data that is not encrypted in accordance with the negotiated encryption protocol for the established secure communication session with
address and packet header information generated in conformance with the established secure communication session
to form test packets; and transmitting the test packets through the DUT between the clients and the servers in the multiple concurrent secure communication sessions.

16. The non-transitory computer-readable recording medium of claim 15, wherein the stress test further includes, prior to the combining to form the test packets, pre-fetching the payload data into a processor cache and then performing the combining without latency for retrieval of the payload data from memory coupled to a processor by a bus external to packaging of the processor.

17. The non-transitory computer-readable recording medium of claim 15, further including setting up network connectivity between the plurality of clients, the DUT and the servers using a pre-selected or automatically selected device configuration of interface types and interface configurations.

18. A testing system including one or more processors coupled to memory, the memory loaded with computer instructions to test handling of secure communication sessions of a plurality of clients with a plurality of servers by a device under test (DUT), the instructions, when executed on the one or more processors, implement actions comprising:

for each connection between (i) a client of the plurality of clients, and (ii) a server of the plurality of servers, setting up a secure communication session through the DUT, the setting up of the secure communication session including:
establishing a secure communication session between the client and the server through the DUT; and
negotiating an encryption protocol for the secure communication session; and following the setup of multiple concurrent secure communication sessions, conducting a stress test on the DUT using the multiple secure communication sessions, the stress test including:
combining
payload data that is not encrypted in accordance with the negotiated encryption protocol for the established secure communication session with
address and packet header information generated in conformance with the established secure communication session
to form test packets; and
transmitting the test packets through the DUT between the clients and the servers in the multiple concurrent secure communication sessions.

19. The testing system of claim 18, wherein the stress test further includes, prior to the combining to form the test packets, pre-fetching the payload data into a processor cache and then performing the combining without latency for retrieval of the payload data from memory coupled to a processor a bus external to packaging of the processor.

20. The testing system of claim 18, wherein the actions further include setting up network connectivity between the plurality of clients, the DUT and the servers using a pre-selected or automatically selected device configuration of interface types and interface configurations.

* * * * *